United States Patent [19]

White

[11] Patent Number: 4,833,793

[45] Date of Patent: May 30, 1989

[54] ANAEROBIC PASTEURIZING CONDITIONING SYSTEM

[75] Inventor: Richard L. White, Dallas, Tex.

[73] Assignee: V. E. Holding Corporation, Arlington, Tex.

[21] Appl. No.: 33,438

[22] Filed: Apr. 1, 1987

Related U.S. Application Data

[63] Continuation-in-part of Ser. No. 860,105, May 6, 1986, Pat. No. 4,667,418, which is a continuation-in-part of Ser. No. 799,014, Nov. 18, 1985.

[51] Int. Cl.$^4$ .............................................. F26B 3/00
[52] U.S. Cl. .......................................... 34/22; 34/33; 34/173; 34/178; 426/623; 426/635
[58] Field of Search ............... 55/DIG. 25; 34/22, 25, 34/33, 168, 171, 173, 178, 51; 426/623, 635, DIG. 807

[56] References Cited

U.S. PATENT DOCUMENTS

| | | | |
|---|---|---|---|
| 2,921,646 | 1/1960 | Poole | 55/DIG. 25 |
| 3,339,349 | 9/1967 | Farnum | 55/DIG. 25 |
| 4,060,912 | 12/1977 | Black | 34/79 |
| 4,667,418 | 5/1987 | White | 34/33 |

Primary Examiner—Henry A. Bennet
Attorney, Agent, or Firm—Stanley R. Moore; Thomas L. Crisman

[57] ABSTRACT

An anaerobic, pasteurizing conditioning system for treating matter such as whole and ground grain, minerals and other ingredients to increase the rate of their conversion and absorption during digestion and thus the nutritional value thereof. The system comprises a direct fired steam generator adapted for producing an effluent stream comprising steam and non-condensible gases, a vapor homogenizer for producing a substantially water-free treatment fluid from the effluent stream, and the treatment fluid containing insufficient oxygen for aerobic bacterial life. The treatment fluid, comprising steam and oxygen deficient non-condensible gases is discharged into the vessel for counter-current flow relative to grain passing therethrough. The operation of the direct fired steam generator is controlled for producing a sufficiently large volume of oxygen deficient gases and steam so that upon passage through the vapor homogenizer a sufficiently large volume of effluent comprising the treatment fluid is provided for purging the grain of other gases flowing therewith and maintaining the deficient oxygen level in the non-condensible gases of the treatment fluid for creating an anaerobic condition. In this manner an improved feedstuff is provided wherein the starch components have first been gelatinized in a heated, anaerobic environment and thereafter fractionated to render the feedstuff more digestible.

28 Claims, 3 Drawing Sheets

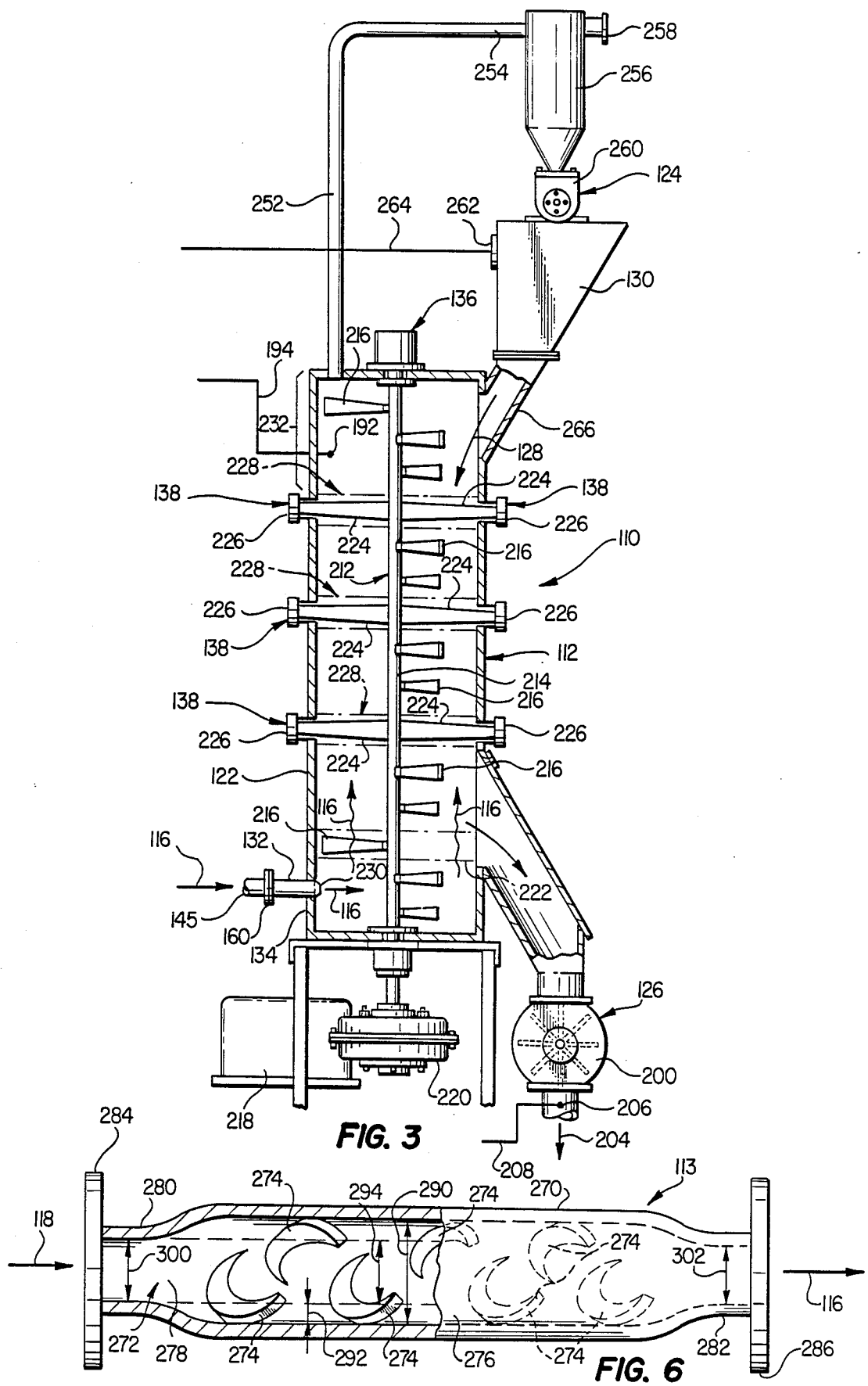

ANAEROBIC PASTEURIZING CONDITIONING SYSTEM

BACKGROUND OF THE INVENTION

The present application is a Continuation-in-Part of U.S. patent application Ser. No. 860,105, filed May 6, 1986, now U.S. Pat. No. 4,667,418, which is a Continuation-in-Part of U.S. patent application Ser. No. 799,014 filed Nov. 18, 1985.

FIELD OF THE INVENTION

The present invention relates to a system for conditioning matter, products of said system and, more particularly, to an anaerobic, pasteurizing conditioning system for treating ground grain, minerals, and other ingredients to increase the rate of conversion and absorption during digestion and thus the nutritional value thereof.

HISTORY OF THE PRIOR ART

"Anaerobic" conditioning of matter, as referred to herein, comprises the broad step of exposing matter to a treatment fluid in an oxygen deficient environment.

"Pasteurizing", as referred to herein, comprises the step of partial sterilization of a substance through temperature and exposure that kills or retards the growth of certain objectionable organisms. The broad process includes steps of anaerobic environmental exposure and/or elevated temperature exposure.

"Conditioning", as referred to herein, also includes the step of exposing matter to various chemicals which react therewith, within some range, the rate of reaction approximately doubles for each 10° C. increment increase in temperature.

"Water-free", as referred to herein, is to be understood to mean that the treatment fluid is substantially free of condensate of water in liquid form.

These and other terms as defined herein have a direct bearing on the description of the present invention and the problems of the prior art overcome thereby.

The matter addressed herein may be a composition of animal, mineral and/or vegetable products and it may be conditioned for direct use in feed, as well as for pelletizing, flaking, bagging, and similar intermediate steps. Unfortunately, few prior art systems have addressed the technological intricacies of matter conversion and absorption during digestion and the effects of aerobic and anaerobic bacteria. It should be recognized that food prepared in an aerobic environment cannot be deposited in an anaerobic stomach with the expectation of maximum efficiency in conversion, absorption and protein bypass.

Treatment fluids used in prior art have generally been comprised of steam, gases and/or combinations thereof adapted for heating, cooling, moisturizing or drying and/or combinations thereof. In many instances the treatment fluid simply provides elevated heat to the matter for the high temperature variety of "pasteurizing" and killing certain heat sensitive organisms such as Salmonella. Unfortunately, this prior art step can also kill many useful organisms. As stated above, pasteurizing can also be effected by providing an anaerobic environment without the necessity of elevated temperatures. However, prior art systems generally use the treatment fluid heat to also attempt to alter the molecular structure of the matter prior to feeding or processing. In one aspect this is helpful in increasing the lubricity of the matter which is useful in subsequent operations such as compression and extrusion. The elevated "pasteurization" heat from the treatment fluid is therein also a source of energy in lieu of higher electro-mechanical energies which would otherwise be expended if a subsequent processing operation is required. Moisture generated in the particulate matter or deposited thereon by the treatment fluid then serves as a lubricant. It should be pointed out that the British Thermal Unit (BTU) content of conventional steam heat is generally solely a function of the steam volume due to the fact that external combustion boilers are typically used. The only means of transferring heat from steam to the grain is thus through its condensation. These considerations have had widespread implications in the conditioning of matter throughout the prior art. Enthalpy levels are critical and when boiler steam is used the only means for adding enthalpy is with the steam. As discussed below, within certain limit, for each temperature rise, of 20° F. increment, the free and bound moisture level of the particulate matter rises 1 percent. Many problems can develop from high moisture contents including plugging of pelletizing dies where grain and such subsequent operations are involved.

Examples of the prior art processes and problems set forth above include conditioning systems for cooking and/or the heating and moisturizing of particulate matter, such as grain mainly, prior to pelletizing steps. This is but one illustration, and the prior art is replete with such systems. Many of these processes incorporate horizontal steam conditioning vessels and boiler steam heat exchangers. Usually, the flow volumes and retention times of the particulate matter passage with the boiler steam are considered the most critical operational parameters. Contact is thus made in a random fashion between the particles to be heated by boiler steam within the steam chambers. In the case of commercial grain treatment, steam from boilers is usually vented into the steam vessels through which various types of grain and microingredients are forced to travel. Steam injected into the vessel condenses on the grain therein for heating and moisturizing it to preselect conditions. As stated above, the BTU content of boiler steam is generally solely a function of the steam volume and the only means of transferring heat to the grain is through its condensation. Problems have thus arisen in the areas of proper cooking temperature, cooking environment, excessive moisture levels, retention time, oxygen availability, homogeniety in treatment, as well as the steam generation itself. This is also true for the conditioning of particulate matter comprised of animal, mineral and/or vegetable products prior to feeding, bagging, compression, or extrusion processes. Both the immediate food value of the matter and its shelf life are critical to the overall nutritional value of the product.

The prior art of steam vessels for both organic and inorganic materials extends into technological antiquity with steam utilized for heating tobacco leaves, grain, flour, vitamins, and animal feed for a multiplicity of purposes. As stated above, grain used as animal feed is often treated with steam to improve its digestibility by the animal and hence to improve its food value prior to feeding or pelletizing.

It is known to use steam to heat and/or moisturize particulate matter prior to feeding, bagging, flaking, or pelletizing. This is particularly true of ground grain. It is therein heated and the moisture level adjusted to preselected parameters which facilitate the above. Generally, the grain coming to the system is ground, mixed with vitamins and minerals and is relatively dry. The composition often has between eleven and twelve percent moisture at ambient temperatures. Dry and cool mixtures require more energy during the pelletizing phase and energy consumption is, of course, critical to effective operation.

Many prior art grain treatment systems have simply addressed the need for moisture control prior to feeding, bagging, pelletizing, or flaking with apparatus which introduces steam and air in combination. For example, U.S. Pat. No. 1,185,622 to Boss teaches a process for conditioning food forming substances. The Boss patent sets forth the moisture treatment of grain or the like in such a manner that it is hydroscopically conditioned by either adding moisture to, or taking moisture away from such particulate matter. The processes similar to Boss are useful in preparing the grain to a condition where it is uniformly hydrous in its character which is necessary for efficient pelletizing. Such product is more uniformly and efficiently pelletized and ultimately digested in given quantities, in shorter time and with greater nutritive and body building effect. For example, the "microingredients" containing much of the vitamins content that is not lost during processing. It has thus been a goal in the prior art grain condition technology to provide a treating "fluid" and system therefor capable of delivering or withdrawing moisture or other substances to or from the material to be acted upon for swelling, shrinking, wetting or drying the material as needed. To affect this end result, air and steam have been utilized in various heating and flowing configurations such as that initially shown in the Boss patent. This prior art does not envision heating the grain to a controlled higher temperature or moisture level so as to process it for better pelletizing. More importantly, it does not envision the functional problems of handling the grain efficiently for pelletizing or for bagging, flaking, and the shelf life considerations associated therewith.

More advanced prior art grain treatment technology in steaming systems have generally included refinements on the age old principle of simple steam moisturizing prior to processing. For example, U.S. Pat. No. 1,574,210 to Spaulding teaches a method and apparatus for steaming grain and the like. A vertical steam chest is thus taught. The Spaulding steam chest utilizes gravity descent and angularly disposed baffles for deflecting the grain. Steam supply ports are provided for the steaming operation of the grain during its descent.

A prior U.S. patent issued to Henson under U.S. Pat. No. 1,174,721 sets forth an improved method of supplying moisture to grain and the like by utilizing the flow of steam and air heated by said steam prior to entry into a treatment chamber. Air, of course, contains oxygen which allows "aerobic" bacteria to proliferate. This step is, therefore, not directed toward facilitating anaerobic conversion in an animal's stomach. The Henson patent further teaches the use of a hygrometer to determine the moisture content of the air. Grain which is fed into the interior of such an "aerobic" mixing treatment chamber comes in contact with the vapor which tends to condense thereupon. In this manner, the amount of moisture deposited in the substance passing through the treatment chamber may be calculated from the data given. Such a system will also work with raw steam being used instead of the mixture of steam and air. This is not always the case with horizontal steam vessels wherein non-condensible air or gases can create "short circuiting" flow paths above the processed grain to greatly reduce operational efficiency.

Aside from steam chest systems, advancements in conditioning technology have addressed the issue of control of various aspects of the steam itself. These aspects include both the adding of moisture to particulate matter and control of the microingredients mixture therein. Steam therein serves as a source of energy and may act as a binding agent when properly utilized. For example, U.S. Pat. No. 4,024,288 issued to Witte illustrates a method of treating particulate matter for conditioning oil containing vegetable raw materials. In the Witte patent, air and steam are utilized for the treatment of the raw material. Again, an "aerobic" system is taught and since air is a non-condensible in such systems, certain problems may arise. The utilization of super-heated steam coming from a heat exchanger which is then mixed with air is set forth and shown in the Witte reference which also discloses an effective means for immersing the raw material into a steam and hot air bath. Material leaving the bath is then dried by air issuing from a hot air heat exchanger. While effective in heating by means of steam, Witte maintains little control over the temperature to which the raw material is heated and requires two separate fluid streams to attain the desired temperature and moisture levels. This system is not particularly adapted for addressing the "functional" problems set forth above.

U.S. Pat. No. 4,249,909 issued to Comolli is yet another technological advancement which sets forth a staged process for drying wet carbonaceous material. The staged drying procedure permits wicking of hydrocarbons contained in coal to seal the surface of dried coal products sufficient to prevent appreciable reabsorption of moisture and consequent heating and spontaneous ignition. The Comolli procedure was developed for this particular application and in so doing manifested the advances made in the state of the art in steam treatment systems. These advances may be seen in part in the efforts to define and control various parameters of steam such as partial pressures. The pressures exerted by each constituent alone in the volume of a mixture at the temperature of the mixture are called partial pressures. The partial pressure is directly related to the mole fraction of a constituent present in a mixture and the total pressure thereof. However, to control partial pressure it is necessary to provide an adequate treatment chamber which evenly distributes and conditions the particulate matter passing therethrough. These aspects are set forth above and comprise the critical difference between acceptable and unacceptable conditioning systems.

It may thus be seen that the usual temperature treatment of particulate matter, such as grain, with steam has been an area of marked technological evolution through the years. The advantages of steam as a moisturizing and heating medium for animal, mineral, and vegetable foodstuffs may likewise be useful if the end product can be selectively controlled. Conventional treatment processes for cellular matter such as grain generally use raw steam as a sole element of a heating medium or in combination with air or similar non-condensible gases for the moisturizing process. As stated above, such processes are typically incapable of effectively treating the grain in the precise manner necessary for maximum effectiveness prior to subsequent use. Specific moisture levels, heat absorption, and final grain temperatures must be obtained in a uniform fashion for reliable and effective pelletizing, bagging, flaking, or storage.

Reasons for the inability of conventional apparatus to meet such demands of the market are due to their inability to evenly and homogeneously process a given quantity of grain or other particulate compositions whereby each section of matter is treated for an equal time to a selected condition with a minimum of energy consumption. Energy consumption is, of course, one critical aspect and the addition of heat or kinetic energy is important relative to operational feasibility. Another equally critical aspect is the nutritional value of the conditioned matter which mandates consideration of the chemical conditioning thereof and the proliferation of various bacteria in the conditioning system. It has been shown, for example, that bacteria which needs oxygen to proliferate ("aerobic" bacteria) is not conducive to animal digestion. Bacteria which does not need oxygen to proliferate ("anaerobic" bacteria) is conductive to animal digestion. In fact, the inside of a stomach is an anaerobic environment where such bacteria proliferate and enzymatic conversion takes place. Selected removal of aerobic bacteria in conditioning of food stuff thus benefits the subsequent enzymatic conversion in the anaerobic digestion process. Consequently, selected removal of aerobic bacteria raises the nutritional value of conditioned matter such as whole and ground grain.

Generally, conditioning requires that the particulate matter be mixed, such as in the blending of various types of grain and feed additives. There are several basic mechanisms by which such particles are mixed. Motions which increase mobility of the particles promote diffusive mixing which can lead to homogeneity. Machines affording such results include tumblers, ribbon mixers, vertical screw mixers, muller mixers, single, and twin rotor mixers. Mixing units are thus necessary for homogeneous conditioning of matter when a treatment fluid is utilized. Mixing of grain and treatment fluids such as steam generally occurs in a horizontal mode in prior art configurations. This configuration often results in the consumption of great quantities of energy and exposure to air. The problem is due to the weight and resistance of the grain when mixed with conventional steam or the like. Another problem which is often encountered is the homogeneity of the mixture.

Yet another problem which may be encountered in the conditioning of grain is the pressure of condensate of water in liquid form in the treatment fluid. The presence of such condensate may result in the caking of grain on various internal components in the grain conditioning system which results in a loss of product as well as undesired shut down of the system to clean such components. Numerous mixing devices for intermixing a plurality of fluids or vapor have heretofore been known. Typical of such devices are disclosed in U.S. Pat. Nos. 2,353,195, 2,817,415, 3,286,992, 3,953,002 and 4,512,935. However, such devices have not heretofore been used in conjunction with a system for the conditioning of grain and are not adapted to provide a substantially water-free treatment fluid. That is, such prior art devices do not teach or even suggest the construction of a device which is adapted to impart a return vector direction to separated water droplets into the "hot" core of the effluent stream so that the treatment fluid utilized in the conditioning of grain is substantially water-free.

The most important criteria in conditioning whole and ground grain should be, of course, the nutritional value of the matter and thus, the rate at which the matter is converted and absorbed during digestion. For this reason, elevated heat and high moisture levels are not always the most appropriate pasteurizing or conditioning elements. For example, "chemical tempering" of the grain will also soften or break down the harder surface of the grain to facilitate digestion. Carbonic acid will attack such grain surfaces and the protein encapsulating the starch, therein making the protein and starch more available for digestion. The availability of such chemical substances in elevated temperatures could thus be seen to be extremely useful because the chemical reaction would be expenentially accelerated with temperature and the nutritional value of the grain and its shelf life further enhanced. Unfortunately, the prior art generally does not address such technological intricacies in grain conditioning.

Conventional conditioning equipment uses steam system to raise the moisture level of the mixture and the temperature of the ground grain composition to the inlet steam temperature. Such system purports to kill dangerous organisms and improve established digestibility characteristics such as starch availability. Tests have shown that this is not the case. Other factors, such as the proliferation of aerobic or anaerobic bacteria during conditioning are not usually taken into consideration. This is unfortunate because it is a proven fact that anaerobic bacteria facilitates digestion. The stomach of animals such as bovine, turkey, swine, poultry, lamb, and even humans is an anaerobic environment where enzymatic digestion takes place. Thus, grain which has been anaerobically conditioned is more susceptible to digestion by anaerobic enzymes and hence more nutritionally beneficial.

It would be an advantage therefor to overcome the problems of the prior art by providing a system for anaerobic, pasteurizing conditioning of grain by an effective and substantially water free heating medium injected into a processing vessel which uniformly carries compositions therethrough. The system of the present invention affords such an operation by utilizing an effluent stream produced by a direct fired vapor generator in conjunction with a vapor homogenizer and a counter flow conditioning vessel having discharge means disposed therein for uniformly passing particulate matter therethrough in an anaerobic environment. The amount of heat for pasteurization may therein be controlled by the rate of fuel burning of the vapor generator or by pressurization, while the retention time may be controlled by the time in which the composition is allowed to pass through the vessel. Anaerobic pasteurizing, chemical tempering, and overall conditioning can thus be completed with less energy expended and with containment of valuable microingredients and the useful anaerobic bacteria in the food substance.

SUMMARY OF THE INVENTION

The present invention pertains to anaerobic, pasteurizing conditioning systems incorporating a direct fired vapor generator, a vapor homogenizer, and a counterflow processing vessel. More particularly, one aspect of the invention includes an improved conditioning system of the type wherein a vessel is adapted for the flow of grain to be conditioned therethrough and means for injection of a substantially water-free treatment fluid therein. The improvement comprises a direct fired steam generator adapted for producing an anaerobic effluent stream comprising steam and oxygen deficient non-condensible gases in the products of combustion, and a vapor homogenizer adapted for vaporizing water particles present in the effluent stream so that the treatment fluid introduced into the vessel for conditioning the grain is substantially water-free. Means are provided for introducing the treatment fluid from the vapor generator through the vapor homogenizer and into the vessel for counter-current flow relative to grain passing therethrough. At least one air lock is disposed in the vessel for permitting the egress of grain having passed therethrough while preventing the exhaust of the treatment fluid therefrom. Means are also provided for controlling the operation of the direct fired steam generator for producing the effluent stream of a sufficiently large volume of mixture of oxygen deficient gases and steam so that passage of the effluent stream through the vapor homogenizer results in a sufficiently large volume of substantially water free treatment fluid to purge the grain of other gases flowing therewith. This maintains the deficient oxygen level in the substantially water-free treatment fluid for creating an anaerobic condition in the vessel which is conducive to subsequent anaerobic conversion.

In another aspect, the direct fired steam generator produces carbonic acid which will be present in the treatment fluid for chemical tempering and rendering grain conditioned therein more acidic. This prolongs the shelf life of the conditioned grain, makes the starch more available in the conditioned grain, and facilitates the subsequent digestive conversion. The conditioning vessel may be disposed in a generally horizontal or vertical configuration. Means are provided in either case for passing the substantially water-free treatment fluid from the vapor homogenizer through a diffuser disposed in a region of the vessel for discharging the substantially water-free treatment fluid in counter-current flow relative to grain passing therethrough. The means for controlling the operation of the direct fired steam generator includes means for determining the oxygen level of non-condensible gases in the effluent stream produced by the direct fired steam generator and the means for adjusting the combustion of the generator to produce oxygen deficient non-condensible gases. The oxygen deficient non-condensible gases in the effluent stream from the direct fired stream generator, and thus in the substantially water-free treatment fluid from the vapor homogenizer, contain between 2% and 5% oxygen.

In yet another aspect, the invention includes an improved method of conditioning grain exposed to steam within a conditioning vessel. The improvement comprises the steps of producing an effluent stream containing steam and oxygen deficient non-condensible gases with a direct fired vapor generator, passing the effluent steam through a vapor homogenizer to vaporize free water present in the effluent stream and provide a substantially water-free treatment fluid, producing an anaerobic, oxygen deficient environment within the vessel by the introduction of the substantially water-free treatment fluid therein, providing means for imparting a homogeneous interaction between the grain within the vessel and the substantially water-free treatment fluid, providing the substantially water-free treatment fluid in sufficient volume and with sufficient enthalpy for purging the system of substantially all other gases and maintaining a temperature therein for anaerobic and/or elevated temperature pasteurization of grain passing therethrough. The direct fired steam generator further produces carbonic acid. The presence of carbonic acid in the treatment fluid renders the processed grain more digestible as well as more acidic. In one embodiment, the conditioned grain is adapted for animal feed and the conditioning renders the grain more readily digestible, more nutritionally valuable and in a condition manifesting a longer shelf life than conventional systems.

BRIEF DESCRIPTION OF THE DRAWINGS

For a more complete understanding of the present invention and for further objects and advantages thereof, reference may now be had to the following description taken in conjunction with the accompanying drawings in which:

FIG. 3 is a side-elevational, cross-sectional view of the vessel of FIG. 2;

FIG. 6 is a side-elevational, cross-sectional view of a vapor homogenizer for producing the substantially water-free treatment fluid for use in conditioning of grain.

DETAILED DESCRIPTION

Figure 1:
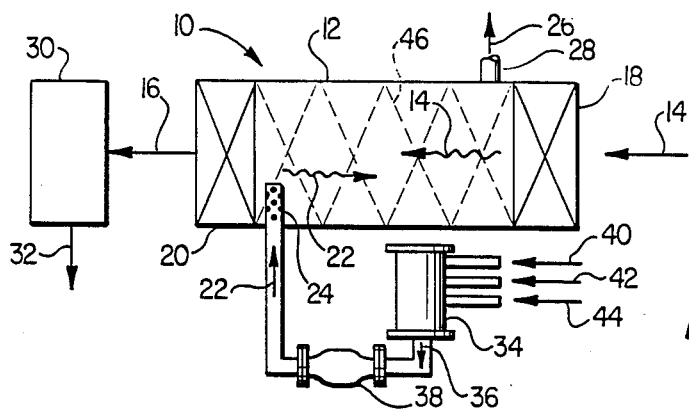
FIG. 1 is a diagrammatic, schematic representation of an anaerobic, pasteurizing conditioning system constructed in accordance with the principles of the present invention.
Figure 2:
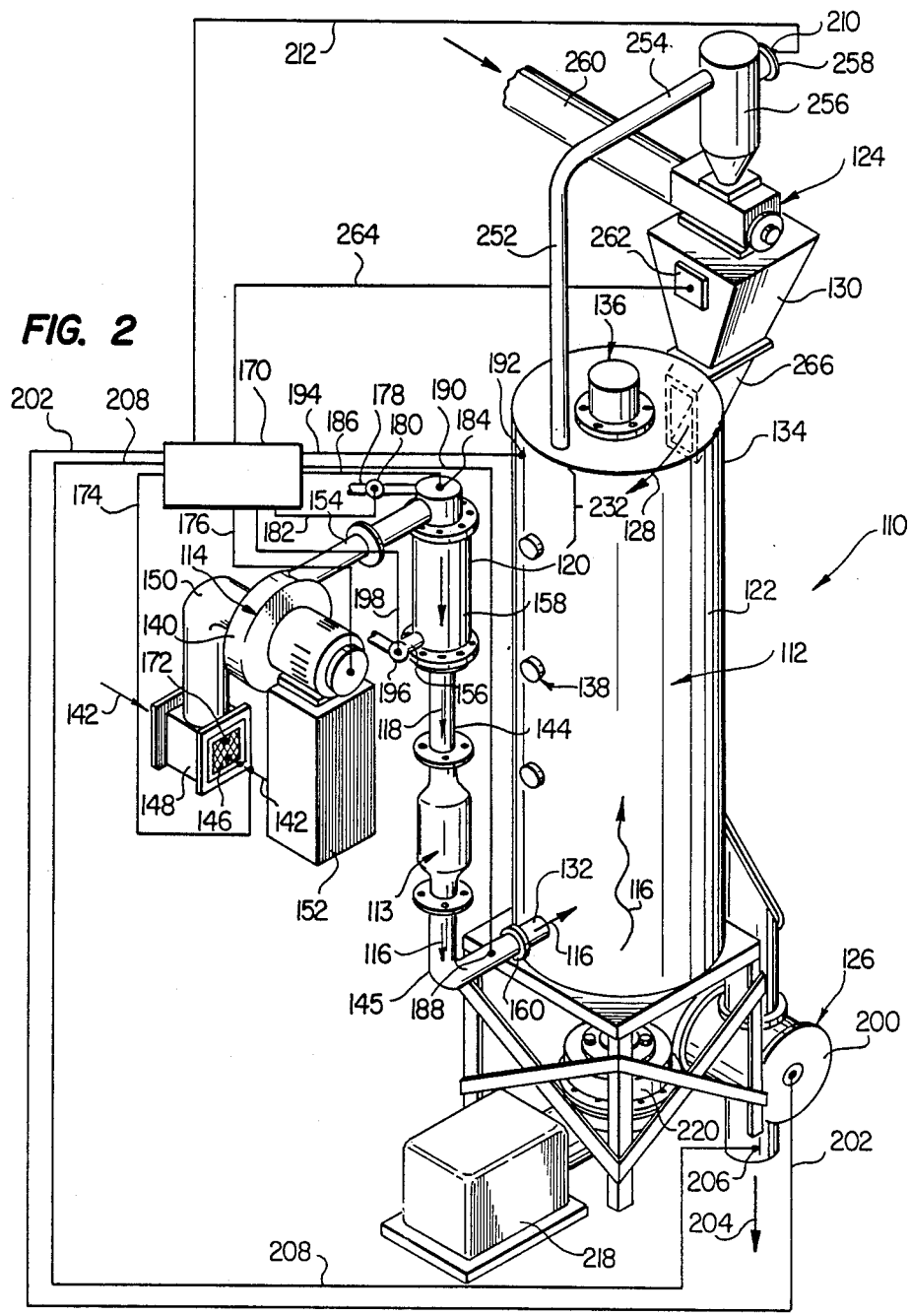
FIG. 2 is a diagrammatic, perspective view of one embodiment of an apparatus of the present invention illustrating the conditioning of grain in a generally vertical vessel in which is injected a substantially water-free treatment fluid.
Figures 4, 5:
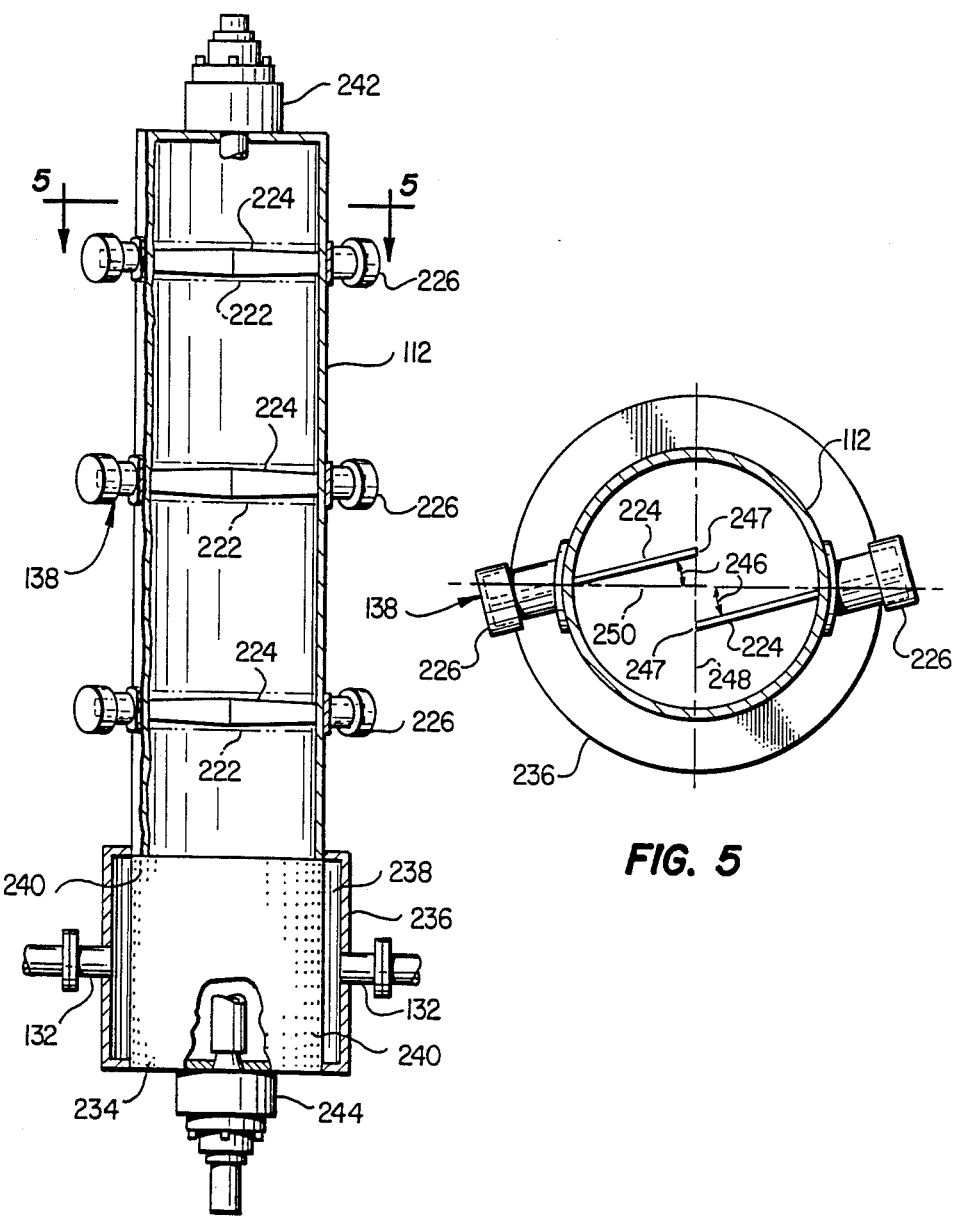
FIG. 4 is a side-elevational, cross-sectional view of an alternative embodiment of the vertical conditioning vessel of FIG. 2 constructed with a plurality of stators disposed therein and a vapor diffuser disposed therearound.
FIG. 5 is a top plan, cross-sectional view of the vessel of FIG. 4 taken along lines 5—5 thereof illustrating the placement of the stators therein.

Referring first to FIG. 1, there is shown a diagrammatic, schematic representation of an anaerobic, pasteurizing conditioning system 10 constructed in accordance with the principles of the present invention. The system 10 comprises a vessel 12 adapted for the passage of grain 14 therethrough. The vessel 12 can be disposed in a horizontal position (as illustrated in FIG. 1) or a vertical position (as illustrated in FIGS. 2-4). The grain 14 egresses from the vessel 12 as conditioned grain 16 after passing through sealing airlock systems 18 and 20. The airlock systems 18 and 20 maintain the counter-current flow within the vessel 12 between the grain 14 and a substantially water-free treatment fluid 22. The substantially water-free treatment fluid 22 is introduced into the vessel 12 through a diffuser panel 24 and flows in a counter-current manner through the vessel 12. After engagement with the grain 14 passing through the vessel 12, the remaining gases are released as illustrated by arrow 26 through exhaust vent 28. The grain 14 which is conditioned in an anaerobic, heated environment in the system 10 of the present invention contains starches, protein and other beneficial nutritional components.

Still referring to FIG. 1, the conditioned grain 16 exiting the system 10 is directed into a mechanical treating system 30 wherein the conditioned matter is subjected to compression. The starch constituents of the conditioned grain 16 are gelatinized by the heated, anaerobic conditioning system 10 of the present invention, and the subsequent compression of the conditioned grain 16 results in mechanical fractionation of the gelatinized starch. The compressed grain issues from the system 30 as feedstuff 32. Thus, the combination of the conditioning of the grain in accordance with the principles of the present invention and the compression of the conditioned grain result in a feedstuff which is more palatable and digestible to the animal. The term "compression" as used herein is to be understood to include the well known processes of pelletizing, flaking and the like.

In accordance with the present invention, a direct fired steam generator 34 is utilized for generation of an effluent stream 36 comprising steam and non-condensible gases. The effluent steam 36 may also contain water in liquid form (i.e. unvaporized water droplets) which can result in caking of the grain within the vessel 12. In order to remove any water in liquid form free water which may be present in the effluent stream 36, and thus provide the substantially water-free treatment fluid 22 for the conditioning of the grain 14 in an anaerobic pasteurizing conditioning environment within the vessel 12, the effluentstream 36 is passed through a vapor homogenizer 38.

The effluent stream 36 exits the direct fired steam generator 34 as a vortiginous stream such that any water in liquid form present in the effluent stream 36 is spun or forced outwardly by centrifugal force. In order to vaporize the liquid water in the effluent stream 36, and thereby provide a substantially homogenous water-free vapor stream for use as the treatment fluid 22 in the conditioning of grain 14 within the vessel 12, the effluent stream 36 is passed through the vapor homogenizer 38. The vapor homogenizer 38, which will be described in detail hereinafter, is provided with an array of spaced apart, angulated segments adapted to impart a return vector direction to any separated water droplets in the effluent stream 36 so that the water droplets are vaporized by the portion of the effluent stream 36 traveling through the central portion or core of the vapor homogenizer 38. Thus, the effluent from the vapor homogenizer 38 is the substantially water-free treatment fluid 22 for use in conditioning of grain 14 in the vessel 12. Further, the unique design of the vapor homogenizer 38 permits one to provide the substantially water-free treatment fluid 22 from the effluent stream 36 of the direct fired steam generator 34 without any substantial gain or loss of heat. That is, the vapor homogenizer 38 is a substantially adiabatic system.

In the generation of the effluent stream 36, air 40 and fuel 42 are combusted in the steam generator 34 to heat water 44, as described in more detail below, to create the effluent stream 36 of steam and the oxygen deficient non-condensible gases. The effluent stream 36 is forced to flow through the vapor homogenizer 38 to produce the substantial water-free treatment fluid 22. The treatment fluid 22 is then forced to flow into the vessel 12 in a direction counter-current to that of the grain 14 to be conditioned and in a sufficient volume for purging any air carried by the grain 14 out of the vessel 12. Unlike boiler steam and other many prior art systems, the present invention addresses a direct fired combustion which produces high temperature steam products of combustion such as $CO_2$ and carbonic acid, with very little available oxygen. It should be noted that by properly tuning the direct fired vapor generator 34 to afford substantially complete combustion, the excess air necessary for the combustion is minimal and may be on the order of 25% or less. That is, 5% or less oxygen is available in the system. This is presented for purposes of illustration only. Such a low percentage of excess air creates a very low percentage of oxygen in the flue gases contained in the treatment fluid 22 introduced into the vessel 12 and thus the "anaerobic" condition. Furthermore, by introducing a sufficiently large volume of treatment fluids 22, i.e., steam and non-condensible gases, relative to the mass of grain 14 travelling therethrough, the oxygen laden air inherently carried by the grain 14 may be purged outwardly therefrom through exhaust vent 28 in the form of discharge gases illustrated by the arrow 26. In order to facilitate the homogeneity of the mass-steam-vapor interaction, mixing means 46 is provided. Mixing means 46 is shown herein in schematic form for purposes of illustration in that a plurality of mixing devices may be utilized as discussed in more detail below. One aspect of the present invention is not the mixing means but the provision of a conditioning environment wherein the effluent stream 36 from the direct fired steam generator 34 is conditioned by passage through the vapor homogenizer 38 to provide the substantially water-free treatment fluid 22 for heating, moisturizing, and otherwise conditioning the grain 14 contained therein without sufficient oxygen for the growth of aerobic bacteria. The conditioning may include "anaerobic pasteurization," "elevated temperature pasteurization," "chemical tempering" and/or moisture with other nutrients. Such a system particularly enhances the growth of anaerobic bacteria, or that bacteria which grows best in an oxygen deficient atmosphere. Other bacteria and organisms which need oxygen to proliferate are either killed or retarded in growth as described and shown in more detail below.

As set forth above, the interaction of the direct fired steam and products of combustion also forms carbonic acid which, with proper mixing with the grain 14, enhances the starch availability of certain matter such as grain used in feeding bovine, turkey, swine, poultry, lamb, and even humans. This is accomplished by chemical tempering by the carbonic acid which breaks down the harder surfaces of the grain. Encapsulated starch is thus released and consequently digestibility enhanced. When the conditioning temperature is raised by 10° C., the rate of chemical tempering approximately doubles. Moreover, the enthalpy of the treatment fluid is not limited solely to the BTU value of the steam, because approximately 35% of the heat value can come from the non-condensible gases produced by the generator 34. This is unlike boiler steam where for every 20° F. temperature increase, the free and bound moisture level rises by one percent. Thus, when the temperature of the grain containing 12% incoming bound moisture is raised to 130° F. by boiler steam, the moisture level of the grain thus rises to 18.5%. This additional moisture can plug a pellet die. Thus, it is critical to be able to add enthalpy to the system without adding moisture to the grain. This requires adding heat with the non-condensible gases as discussed above. In this manner, the system of the present invention can enable selection of a dew point and temperature independently.

The capacity to select, or dial-a-dew point, independent of the enthalpy in the present system means that the rate of chemical tempering and ultimate grain temperature can be controlled without affecting the volume of steam and the moisture level of the grain. Moisture levels are, of course, important to the proper generation of carbonic acid. Carbonic acid renders the conditioned matter more acidic, which extends its shelf life. This diagrammatic illustration of the process is set forth for purposes of emphasizing the basic elements of the present invention relative to the various structural system technology previously set forth by applicant in copending applications Ser. Nos. 771,337, 799,014 and 589,260 assigned to the assignee of the present invention. By controlling the products of combustion and tuning the direct fired vapor generator for producing carbonic acid, a minimum amount of oxygen, and select quantities of steam, the nutritional value and shelf life of grain can be greatly enhanced which is a marked advance over prior art systems.

Referring now to FIG. 2, there is shown one embodiment of a grain conditioning system 110 constructed in accordance with the principles of the present invention. Although matters of animal, mineral or vegetable variety may be processed, the term "particulate matter" is used herein to designate discrete particles of any mass subjected to anaerobic, pasteurizing conditioning. The system 110 of FIG. 2 is shown to comprise a vertical treatment vessel 112, a vapor homogenizer 113 and treatment fluid generation unit 114. As set forth above, the treatment fluid 116 of the present invention is an effluent stream 118 comprising direct fired steam and the products of combustion which is conditioned by passage through the vapor homogenizer 113 so that the treatment fluid 116 is substantially water-free, or free from water condensate in liquid form. The unit 114 as shown herein comprises a direct fired vapor generator 120 for producing the effluent stream 118 of steam and non-condensible gases. Vapor generators include vessels wherein fuel and oxidant are burned to heat water added thereto so that steam and non-condensible gases are discharged. In the present invention, steam and carbonic acid are produced with the non-condensible gases that contain relatively small quantities of oxygen.

The vertical treatment vessel 112 of FIG. 2 includes a cylindrical chamber 122, upper airlock-feed system 124, and lower airlock discharge unit 126. Grain 128 passes from an upper surge bin 130 coupled to the chamber 122 for providing continuous matter flow. The grain 128 is exposed to treatment fluid 116 discharge therein through conduit 132 positioned along side wall 134 of the chamber 122. A rotor or paddle system 136 is incorporated with a stator system 138 to establish a plurality of notional mixing planes of the oxygen deficient treatment fluid 116 and the grain 128. This eliminates defined steam or gas channels and maintains homogeneity of the grain 128 and the treatment fluid 116, i.e. steam and non-condensible gases. With the system shown herein select heating and liquid constituent control of the grain 128 can be achieved.

Still referring to FIG. 2, unit 114 as shown herein comprises the direct fired vapor generator unit 120 and a blower 140. The vapor generator 120 provides a myriad of advantages as discussed below. Input to the vapor generator 120 is supplied by the blower or compressor 140 wherein intake air 142 is heated in the generator 120 and mixed with steam and non-condensible gases generated thereby. The unit 114 discharges the effluent stream 118 through a conduit 144 for passage though the vapor homogenizer 113. The vapor homogenizer 113 discharges the substantially water-free treatment fluid 16 through a conduit 145 for passage into the cylindrical chamber 122. The air 142 is drawn into the compressor 140 through filter screen 146 covering intake manifold 148 and vectored through intake pipe 150. The blower 140 is mounted upon a support chassis 152 (diagrammatically shown) which may also support the related elements of the treatment fluid generation unit 114. The blower 140 is then coupled to the vapor generator 120 through an air discharge conduit 154. Air entering the vapor generator 120 supplies the oxidant for combustion occurring therein, which combustion produces heat for raising the temperature of water supplied therein above the vaporization phase in the production of steam. A water supply conduit 156 is thus shown coupled to body 158 of the vapor generator 120. The water is vaporized by said combustion and the effluent stream 118 of the vapor generator 120 is discharged through exhaust conduit 144 and into the vapor homogenizer 113 wherein free water in liquid form present in the effluent stream 118 is vaporized to provide the substantially water-free treatment fluid 116. The treatment fluid 116 is then discharged through conduit 145 which is coupled to the vessel 112 by coupling flange 160.

The operation of the vapor generator 120 as shown in FIG. 2, is tuned to produce a minimum amount of $O_2$ with the products of combustion in the effluent stream 118, and thus the treatment fluid 116. This may occur with or without a stoichiometric mixture. In fact, excess air is generally needed to drive combustion to completion. With complete combustion and minimal excess air (around 25%), the availability of $O_2$ in the effluent stream 118, and thus the treatment fluid 116, is less than 5%. This is both empirically correct and provable by experimentation. The amount of 5% or less $O_2$ in such an environment will not sustain aerobic bacterial growth and is referred to herein as an anaerobic condition. Exposing aerobic bacteria to such an environment will, of course, kill or retard the growth of said aerobic bacteria, herein referred to as "anaerobic pasteurization". Thus, as the substantially water-free treatment fluid 116 (i.e., a mixture of steam and non-condensible gases) passes through the chamber 122, the grain 128 and microingredients loaded through the surge bin 130 and upper region thereof are effectively heated and pasteurized anaerobically and/or pasteurized by elevated temperature while being moisturized and treated with carbonic acid for improving the food value thereof. This is all done in an environment where only anaerobic bacteria can proliferate and the rate of chemical tempering with carbonic acid can be accelerated. As stated above, it has been shown that anaerobic bacteria facilitate digestion in animals, because an animal's stomach is an anaerobic environment. The present invention thus vastly improves the nutritional value of the grain, as well as the shelf life thereof through the carbonic acid produced by direct fired steam.

Referring still to FIG. 2, a control unit 170 is provided for integrating temperature readings of the various processing fluids as well as the grain 128 and controlling the operation of the system 110 in accordance with the principles of the present invention. Temperature sensor 172 is thus disposed in the air intake manifold 148 and coupled to control unit 170 by sensor line 174. Likewise operation of the blower or compressor 140 is controlled by control line 176 coupled to the control unit 170. Fuel is provided to the vapor generator 120 by fuel line 178 proportioned by control device 180 coupled to control unit 170 by control line 182. Performance parameters of the vapor generator 120 are monitored by sensor array 184 coupled to control unit 170 by control line 186. Temperature of the treatment fluid 116 (hot gas stream) is monitored by sensor 188 disposed in conduit 145 and coupled to control unit 170 by sensor line 190. Temperature of the grain 128 is likewise monitored by sensor 192 coupled to control unit 170 by sensor line 194. Water flowing through conduit 156 to vapor generator 120 is regulated by valve 196 which is controllable by control unit 170 and coupled thereto by control line 198. Grain 128 passing through chamber 122 is therefore exposed to the substantially water-free treatment fluid 116, i.e. steam and non-condensible gases, produced by selectively controllable parameters in the upstream vapor generation unit 120, passage of the effluent stream 118 through the vapor homogenizer 113 and percolation of the substantially water-free treatment fluid 116. The length of time of travel of the grain 128 through a series of notional mixing planes within chamber 122 is therefore selectively controllable through actuation of the airlock discharge system 126. The airlock discharge system 126 of this particular embodiment is comprised of a rotating gate valve system 200 which is coupled to the control unit 170 through control line 202. Both the control and illustration of the airlock discharge system 126 of FIG. 2 is presented for purpose of illustration only. A garner system or the like as set forth in co-pending patent application Ser. No. 766,640, filed Aug. 15, 1985 and assigned to the assignee of the present invention may also be used herewith. The temperature of the discharged grain 204 may be monitored by a sensor 206 positioned beneath the airlock discharge unit 126 which is coupled to the control unit 170 by sensor line 208. Finally, the levels of $O_2$ and fuel present in the treatment fluid exhausted from the chamber 122 via the airlock system 124 can be monitored by a sensor 210 coupled to control unit 170 by sensor line 212. The control unit 170 can be equipped with conventional constituent level measurement equipment for regulating the anaerobic conditioning described herein. In this manner, the control unit 170 may be used to monitor and control the operation of system 110 in accordance with the principles of the present invention.

Referring now to FIG. 3 there is shown an enlarged, side-elevational, cross-sectional view of one embodiment of the vertically, disposed cylindrical chamber 122 of the particulate matter conditioning system 110 constructed in accordance with the principles of the present invention. It should be noted that the particular embodiment of the vessel 112 shown herein is but one embodiment of the chamber 122 and the method and apparatus of the present invention. Both horizontal and vertical systems can be used. The paddle system 136 is constructed of a paddle shaft assembly 214 comprising a central shaft 215 and a plurality of paddles 216 mounted there upon. The paddles 216 are staggered both longitudinally and rotationally one to the other and are constructed with a preselect pitch. The lower paddles 216 swirl and propel particulate matter in an upward direction while the upper paddle 216 propels vapor and matter downwardly. Rotation of the paddles 216 is provided by a motor 218 coupled to a gear box 220 disposed immediately below the shaft 215 for rotation thereof at preselect speeds. In this manner, grain 128 descending through the vessel 112 may be fluffed and propelled upwardly along various notional mixing planes 222 defining the regions of rotation of the paddles 216 whereby ascending treatment fluid 116, such as steam and non-condensible gases, is thoroughly and homogeneously mixed therewith. It should be noted that by providing sufficient treating fluid volume, the air carried in by the grain 128 will be purged from the system 110 by the counter-current flow. This step is necessary to reduce the $O_2$ level to achieve anaerobic conditioning and thus the airlock system is used.

Still referring to FIG. 3, the vessel 112 is further constructed with the stator system 138 which comprises a plurality of stators 224 disposed between certain ones of the paddles 216 longitudinally therealong. Each stator 224 is secured to the side-wall of the vessel 112 by securement caps or bulkheads 226. Stators 224 are disposed diametrically opposite one another within the vessel 112 to define a notional stator or "counter-swirl" plane 228. The notional stator planes 228 are disposed longitudinally along the vessel 112 between arrays of the paddles 216 as shown in the drawing. In this manner, the rotation and propelling of grain 128 by the paddle system 136 is divided into segments to prevent a continuous pattern of swirling particulate matter through the vessel 112. Such a condition can produce "predefined vapor paths" therethrough. This term is used to describe the condition wherein the vapor "finds" a low resistance flow path. Without stators 224 this "predefined path" is usually in the center region of the vessel 112 due to the outwardly swirling matter. This condition results in the vapor not being uniformly mixed with the grain. Pockets of air and 02 could otherwise form to prevent anaerobic conditioning. The stators 224 in essence create the "counter-swirl" notional planes 228 blocking both the movement of particulate matter between discrete paddle sections propelling matter back to the center of the vessel 112 and further inhibiting defined vapor flow paths upwardly therethrough.

In accordance with the principles of the present invention the ascending flow of vapor then homogeneously interacts with the particulate matter, an action the stators 224 effectively accomplish. The absence of the stators 224 can, under certain circumstances and conditions, permit vortexual swirling of the particulate matter or grain induced by the paddle system 136. When this occurs, vapor can channel upwardly throughout the vessel 112, attributing to non-homogeneous, aerobic interaction and inefficient conditioning as outlined above. The positioning of the stators 224 further facilitate discrete segmentizing of the fluffing and propelling of the particulate matter upwardly across the various notional mixing planes 222 defined above. The regions of rotations of the paddles 216 are thus provided in sufficiently small axial sections to maximize the inhibiting of vapor channeling between notional mixing planes 228.

For purposes of example only, it should be noted that the vessel 112 may be constructed of stainless steel, or the like. In one such construction the paddle system 136 has been formed of fifteen separate paddles 216, although the exact number is not controlling. In this construction of the system 110, the paddles 216 were constructed in 24 inch lengths set at a 30° pitch for fluffing the grain upwardly. As further recited herein, the uppermost paddle 216 is preferably set with a downwardly directed pitch for forcing the particulate matter in a downward direction. As shown in the drawings, the paddles 216 are angularly offset one from the other which, in one embodiment, included a 120° offset. In this configuration a grain mash was prepared for pelletizing with the paddle system 136 installed in a vessel 112 constructed of a 10 foot height. The paddle system 136 was operated at a speed of 200 rpm and a steam pressure of 1.5 psi.

Still referring to FIG. 3, substantially water-free treatment fluid 116 from the vapor homogenizer 113, such as steam and non-condensible gases, is injected into the chamber 122 through the conduit 132 and dispersed therein by one or more steam nozzles 230 installed in the side walls of the chamber 122. Steam nozzles 230 are but one example of steam injection means and any of a variety of steam injection manifolds or systems may be utilized. The utilization of the paddle system 136 and the fluffing action along notional mixing planes 222 as illustrated herein facilitates the homogeneous mixture of the steam and particulate matter. As stated above, the matter may be of an animal, mineral or vegetable variety. The term "particulate" likewise refers to any of a variety of sizes including dust, microscopic particles as well as pellets, rocks and the like. This wide latitude of matter composition and size is feasible due to the vertical orientation of vessel 112 with paddle system 136 establishing a plurality of homogenous mixing planes therein. Therefore the precise infusion of the treatment fluid 116 into the vessel 112 is not as critical as in many prior art configurations. Treatment fluid 116 rising from nozzle 230 engages the lower most rotating paddle 216 and notional mixing plane 222 thereof to become evenly dispersed therearound. The resulting rising treatment fluid 116 continues to penetrate the numerous notional planes 222 of paddle rotation and notional planes 228 of stators 224 for homogeneous interaction with the descending grain 128 in a uniform condition or pattern. Pressures and temperatures will, of course, vary with each notional mixing plane 222 depending on its vertical position within vessel 112. The pattern can be selected for particular components such as grain, microingredient, or dust configurations. Moreover, the percolation of the treatment fluid 116 (i.e. oxygen deficient, non-condensible gases generated by the vapor generator 114 and passed through the vapor homogenizer, as shown in FIG. 2) upwardly through the notional planes 222 and 228 produce a medium of low resistance to rotation of the paddles 216, as the non-condensible gases displace the heavier grain 128. The presence of non-condensible gases in the treatment fluid 116 thus reduces energy consumption which increases unit efficiency. Heat from the treatment fluid 116 is thus added more homogeneously in the notional mixing planes 222 to further reduce energy consumption. Due to the construction of the airlock discharge system 126 and the paddle system 136, ground grain, microingredients and the like passing therethrough are uniformly distributed and are not subject to agglomeration and channeling as is so prevalent in prior art steam moisturizing chambers of either vertical or horizontal configurations. The method of flow diversion and steam handling through the airlocks herein controls and effectively maximizes energy consumption relative to grain heating. Heat for pasteurization can thus be added to the particulate matter, such as grain, in the vessel 112 prior to subsequent pelletizing wherein energy consumption costs are much higher. As stated above, heat is an additional source of energy in lieu of added electrical horsepower and can increase lubricity of the particulate matter. This is a critical step in grain conditioning because the subsequent step of pelletizing is much more efficient if the pelletized die is lubricated by moisture in the grain. Tonnage rates can drop by over 50% if the grain is not properly conditioned. Likewise, too much moisture can cause equally severe problems and thus the present invention provides means for establishing both temperature and/or moisture levels in the grain prior to pelletizing.

Referring still to FIG. 3, the air lock discharge system 126 is illustrated wherein the gate valve system 200 is provided for actuation and elimination of heated and moisturized grain 204 uniformly from the vessel 112. As stated above, a single or multiple garner system may likewise may be utilized as set forth in co-pending patent application Ser. No. 766,640. In either manner, the bulk of the treatment fluid 116 is forced to uniformly rise within the chamber 122 for exposure to an homogeneous interaction with the grain 128, dust, and microingredients passing therethrough prior to compression and extrusion operations such as pelletizing. The propelling of microingredients and dust upwardly with the treatment fluid 116 as shown herein further enhances the interaction and mixture thereof in the moisturization step. When conditioning ground grain, the microingredients and grain dust are urged to agglomerate prior to passage through the lower airlock discharge unit 126. Dust and/or microingredients which reach the upper most level of the chamber 122 in the upper region 232 engages the upper most paddle 216 which is preferably constructed with a downwardly directed pitch for propelling the fine dust particles and microingredients downwardly into the mixture of grain 128 passing thereunder. The utilization of a downwardly deflecting uppermost paddle 216 has been shown to be abundantly useful in containing microingredients of ground grain and microingredients in prepelletizing mixtures due to the fine consistency thereof. It should be noted that the value of the pelletized mixture is contingent to a large part on the homogeneous inclusion of the microingredients due to their high vitamin content and the tendency thereof to be eliminated during many prior art steam and moisturizing processes. However, to further insure the containment of all microingredients and grain dust particles, other support systems described below are utilized herewith.

Referring now to FIG. 4 there is shown a diagrammatic, side-elevational, cross-sectional view of the vessel 112 and the stator system 138. The paddle system 136 has been removed to more clearly illustrate the alignment and mounting of the individual stators 224. It may be seen that the stators 224 are secured to the outer walls in the vessel 112 by the mounting bulk heads or caps 226. The caps 226 may be welded pipe sections with threadably mounted ends to facilitate assembly. The mounting bulk heads 226 allow each stator 224 to be secured within the vessel 112 in generally parallel spaced relationship along notional mixing plane 222. In this particular embodiment a perforated diffuser plate 234 is also shown in the lower region thereof. In this alternative embodiment of a method and apparatus for infusing the treatment fluid 116 into the chamber 122, an outer cowling 236 is provided in flow communication with conduits 132. The outer cowling 236 provides an annular region 238 for the treatment fluid 116 to fill and evenly ingress into vessel 112 through the perforated diffuser plate 234. Diffuser plate 234 may be cylindrical and preferably contains a plurality of apertures 240 for allowing equal flow of the treatment fluid 116 from region 238 into vessel 112 and engagement with the grain 128 therein. In this particular embodiment the structural configuration for both the conduits 132, cowling 236 and shaft mounting members are illustratively shown. Upper shaft mounting section 242 and lower paddle shaft mounting section 244 are seen in concentric alignment relative to the vessel 112 for supporting the rotational motion of the centralized paddle system 136 (not shown).

Referring now to FIG. 5 there is shown a top plan, cross-sectional view of the vessel 112 of FIG. 4 taken along lines 5—5 thereof. Stators 224 are shown to be secured outwardly of the wall of the vessel 112 by the fastener bulk head 226. As stated above, one method of mounting the stator 224 is to provide a threaded pipe and head to which the stator 224 is secured by welding, or the like. In this manner, the stator 224 and the fastener bulk head 226 can be unscrewed from the pipe section and removed from the vessel 112. This allows the paddle system 136 (see FIG. 2) to be lifted out of the vessel 112 for repair or installation.

Still referring to FIG. 5, each stator 224 is aligned in generally parallel spaced relationship with the stator 224 disposed on the opposite side of the vessel 112 to establish the notional stator plane 228, thereacross. For purposes of establishing the notional plane 228, each stator 224 is mounted at an angle 246 relative to a diameter line passing through the caps 226 and vessel 112. The stator 224 is of a length such that a distal end 247 thereof terminates along diameter line 248, which is generally orthogonal to diameter line 250 from which angles 246 subtend. As may further be seen in this top plan view, the flow diffuser cowling 236 is disposed beneath the stators 224 in further illustration and construction thereof. It is to be understood that this is but one embodiment of a construction of a perforated diffuser plate 234.

The utilization of stators 224 as described herein provides a very distinct advance over systems not incorporating the stators 224 by segregating the notional mixing planes 222 as shown in FIG. 2. These stators 224 block the swirling flow of particulate matter relative to the rotating paddles 216 above and below the stators 224. When the matter is blocked, it is propelled back toward the center of the vessel 112 due to the angle 246 of the stators 224. An angle on the order of 30° has been found operable and effective in counter-swirling the grain 128 and other matter above and below the stators 224 and in preventing channeling of the treatment fluid 116 therethrough. It should also be noted that the stators 224 can be placed between any number of paddles 216 comprising an array although only two paddles 216 are shown in FIG. 2 between each stator 224.

The present invention utilizes the effluent stream 118 from the direct fired vapor generator 120 of the type wherein the effluent stream comprises steam and oxygen deficient non-condensible gases. The effluent stream 118 is then passed through the vapor homogenizer 113 wherein any particulate water or condensate is vaporized to provide the substantially water-free treatment fluid 116 which is fed into the vessel 112 to condition the grain 128. The treatment fluid 116 facilitates paddle rotation, homogeniety in the notional mixing planes 222 and an anaerobic conditioning environment. However, such a system requires the discharge of the non-condensible gases of the treatment fluid 116 and the air purged from the grain 128 as shown in FIGS. 2 and 3. A separator line 252 is thus provided for collection of the purged air and flue gases and the concomitant collection of valuable dust latent particles therein. These particles rising with the non-condensible gases of the treatment fluid 116, which pass the upper deflector paddle 216, are collected in the separator line 252 which is secured in flow communication to the upper region 232 of the vessel 112. The opposite end 254 of separator line 252 is coupled in flow communication to a vortex separator unit 256, or the like, which effectively separates particles from the gas vapor flowing therethrough. The vortex separator 256 is of an established prior art design commonly utilized in the grain industry at various process stages thereof. The conventional vortex separator incorporates a high speed cylinder in engagement with the gaseous infusion from separator line 252 whereby particles are centrifugally contained and vectored downwardly into the grain processing system while "scrubbed" vapor or treatment fluid 116 is allowed to be discharged through vent 258. In the present invention, the vortex separator 256 is showed and mounted on top of an inlet feed screw 260, which is in sealed communication with the upper airlock system 124. The upper airlock system 124 as shown herein is particularly adapted for receipt of grain fed from storage bins (not shown). The grain, microingredients, and dust are thus passed through airlock system 124 into the upper surge bin 130. The surge bin 130 is formed in a tapered configuration to facilitate flow while containing preselect levels of particulate matter, such as grain 128 necessary for continuous operation and processing in the vessel 112. A bindicator 262 is mounted to the surge bin 130 providing means for indicating grain level. The bindicator 262 is likewise coupled to the control unit 170 by control line 264 as shown in FIG. 2. Infusion of grain 128 into the surge bin 130 is thus controlled by a response to the bindicator 262 through control unit 170. Utilization of bindicators 262 and surge bins 130 is, in and of itself, conventional in the prior art. However, in the present invention the surge bin 130 further comprises a necked region or area 266 in the vicinity of the upper region 232 of the vessel 112. The necked region 266 provides a choke feed for the descending flow of grain 128 as well as the ascending flow of the treatment fluid 116, i.e. steam and non-condensible gases. In this manner, the steam and non-condensible gases comprising the treatment fluid 116 are forced to remain within the vessel 112 unless exhausted through separator line 252.

Referring now to FIG. 6, therein illustrated is the vapor homogenizer 113 employed to condition the effluent stream 118 from the direct fired steam generator 120. The vapor homogenizer 38 of the system 10 (FIG. 1) and the vapor homogenizer 113 of the system 110 (FIGS. 2-5) are identical in construction and operation. Further, the vapor homogenizers 38 and 113 provide the substantially water-fee treatment fluids 22, 116 for the conditioning of grain in the systems 10 at 110 of the present invention. Thus, only vapor homogenizer 113 will be described in detail hereafter.

The vapor homogenizer 113 comprises a tubular housing 270 having a flow passage 272 extending therethrough, and a plurality of angulated, arcuately-shaped baffles 274 disposed within a medial portion 276 of the housing 270 for defining a central or core portion 278 of the flow passage 272. The housing 270 is further characterized as having a first end portion 280 and an opposed second end portion 282. The first end portion 280 of the housing 270 is connected to the conduit 144 by a coupling flange 284; and the second end portion 282 of the housing 270 is connected to the conduit 145 by a coupling flange 286 such that fluid flow connection is established between the conduits 144, 145 through the vapor homogenizer 113.

The arcuately-shaped baffles 274 disposed within the housing 270 cooperate to define the central or core portion 278 of the flow passage 272 extending through the medial portion 276 of the housing 270. The medial portion 276 of the housing 270 is provided with a sufficient diameter 290, and the baffles 274 are provided with a sufficient length 292 so that the diameter 294 of the core portion 278 is substantially equal to the inside diameter (not shown) of the conduit 144 and the inside diameter (not shown) of the conduit 145. Further, the inside diameter 300 of the first end portion 280 and the inside diameter 302 of the second end portion 282 are substantially equal to the diameter 294 of the core portion 278. Thus, substantially unrestricted flow of the effluent stream 118 is provided through the core portion 278 of the vapor homogenizer 113.

The effluent stream 118 exhausted from the steam generator 120 and traveling through the conduit 144 and the first end portion 280 of the vapor homogenizer 113 has a swirling motion. This motion causes any liquid water components present in the effluent stream 118 to be spun to the outside portion of the effluent stream 118 via centrifugal force. Thus, as the effluent stream 118 enters the vapor homogenizer 113 the water is slung or directed outwardly into contact with the baffles 274. The angle and configuration of the baffles 274 cause the water to be redirected in a forward direction and inwardly into the core portion 278 of the flow passage 272 through which is traveling the hottest portion of the effluent stream 118, i.e. the flue gases. Because the flue gases are much hotter than the steam, the water droplets redirected into the core portion 278 are vaporized by the hot flue gases traveling therethrough. Any unvaporized water droplets will again be spun back out into contact with the baffles 274 where they will again be directed into the core portion 278. Water droplets impinge upon the baffles 274 and are redirected by the baffles 274 into the core portion 278 for contact with the hot flue gases passing therethrough. This results ultimately in the vaporization of the water droplets to produce the substantially water-free treatment fluid 116 for use in the conditioning of grain in accordance with the present invention.

Referring now to FIGS. 2 through 6, in combination, it may be seen that the assembly of the present invention utilizes the system 10 capable of anaerobic, pasteurizing conditioning of any matter present within the vessel 112. This control is effected by the effluent stream 118 comprising oxygen deficient flue gases in a direct fired vapor generator, the passage of the effluent stream 118 through the vapor homogenizer 113 to produce the substantially water-free treatment fluid 116, the homogeneous mixing of the treatment fluid 116 and grain 128 through the plurality of notional mixing planes 222 and 228 described above and the control of enthalpy, partial pressure and dew point in the vessel 112. The control of enthalpy, partial pressure, and dew point within vessel 112 is most clearly set forth and described in co-pending application Ser. No. 589,260, filed Mar. 13, 1984, assigned to the assignee of the present invention and incorporated herein by reference. By providing a closed system such as that shown herein with upper and lower airlocks 124, 126, means for homogeneous particulate, and treatment fluid 116 flow therethrough said parameters may be controlled for maximizing the efficiency in particle conditioning. With the combination of the direct fired steam generator 120 and the vapor homogenizer 113, the rate of heating is also controlled by the rate of fuel burning while the moisture content and maximum temperature generated in the grain 128 can be controlled through the partial pressure of the condensible vapor and dew point within the vessel 112. The utilization of the rotating paddles 216, stators 224 and mixing planes 222 and 228 facilitate preselect homogeniety and uniform distribution of enthalpy, partial pressure, and dew point therein. As stated above, these parameters vary along the vertical height of the vessel 112 and throughout the counter-current course of flow. The partial pressure and dew point are, in turn, determined by the fluid flow rates in the fluid generator 114 and/or the introduction of extra amounts of non-condensible gas and the total pressure at which the system 110 operates. By utilizing the airlock feed system 124, the airlock discharge system 124 of the present invention, and the separator line 252, the overall system 110 may be pressurized for variations in altitude, temperature, and product processing requirements.

In operation, the vessel 112 and the system 110 (FIGS. 2–6), and the vessel 12 of the system 10 (FIG. 1) of the present invention have been found to be effective in reducing energy consumption in the processing of grain and increasing the nutritional value of the grain by counter-flow treatment with the treatment fluid 116. The present system 110, utilizing both swirling and counter-swirling notional planes 222 and 228, respectively, disposed longitudinally along the vertical vessel 112 and created by the array of the paddles 216 and the stators 224 disposed therein, has substantially reduced the amount of energy required for temperature and moisturizing conditioning of mash, a ground up grain mixture utilized for animal feed.

In one test utilizing the apparatus as described herein, 808,000 BTU's per hour were utilized for a mass flow rate of 11.56 tons per hour. The resultant energy consumption was established to be approximately 70,000 BTU's per ton of mash. This is a significant reduction over conventional processing consumption rates. Moreover, the grain mixture had a much higher nutritional value. Conventional processing consumption rates on the order of 200,000–250,000 BTU's per ton of mash are common for "apparent" equivalent moisture and temperature conditioning treatment. The term "apparent" is used because conventional equipment does not provide the anaerobic, pasteurizing conditioning set forth herein. For this reason it may be seen that the utilization of the method and apparatus of the present invention affords a great advantage over the prior art and greatly enhances total savings.

It will be noted that the counter-swirl mixing planes provided by the stators 224 disposed between the rotating paddles 216 greatly facilitate the homogenous interaction of the temperature and moisture of the treatment fluid 116 ascending through the vessel 112. As described above, the paddle and stator configuration prevents the undesirable confined channeling of the treatment fluid 116 through low pressure regions which would ordinarily be created in many prior art configurations. When the treatment fluid 116 is allowed to channel upwardly without homogenous interaction with the particulate matter, air trapped in the matter cannot be purged out for anaerobic conditioning. Moreover, a great deal of energy will be lost and more processing time will be necessary for uniform treatment of the particulate matter. The present invention over-comes these problems of the prior art as herein described and therein provides a marked advantage for treatment of animal, mineral and/or vegetable matter in a counter-current flow configuration.

The conditioning system of the present invention utilizes the controlled heat, combustion products, and homogenous mixing characteristics as described to effectuate anaerobic and/or elevated heat pasteurization to kill or retard the growth of undesirable bacteria as well as providing heretofore unrecognized conditioning advantages. The rate of such conditioning can also be varied to maximize starch availability in grain compositions or to render the grain more acidic to prolong its shelf life. Since the value of the grain depends on its ability to be stored and to nourish animals fed therewith, the aspect of shelf life, starch availability and other nutritional characteristics such as proliferation of anaerobic bacterial growth are critical considerations. It has been shown by experimentation and in vitro studies that grain conditioned in a system, such as the systems 10, 110 hereinbefore described, and heated by a stream produced from a direct fired vapor generator in an anaerobic environment is more readily digestible by ruminant animals and more efficiently converted to body weight in said animals. This is because such conditioning makes the feed more compatible to the type of chemical reaction occurring in an animal's stomach. In the case of bovine, the feed is converted to energy maintenance and growth in the first stomach, allowing the remainder of the unconverted protein and starch to pass to the second stomach.

As more specifically set forth above, a sufficient volume of the treatment fluid 116 produced by passage of the effluent stream 118 comprising direct fired steam and non-condensible through a vapor homogenizer 113 is necessary for adequately purging the mass flow of air carried therewith to remove water in liquid form from the treatment fluid 116, as well as to improve the process. For this reason as well as the necessity for homogeneous mixture between the grain to be heated and the treatment fluid, a counter-flow environment is provided in conjunction with an appropriate air lock system for sealing the system. Without such an airlock device as shown herein, the treatment fluid comprising substantially water-free steam and non-condensible gases would not be forced to flow against the movement of the grain and pockets of air could be created for permitting the proliferation of aerobic bacterial growth. Likewise, proper conditioning of the grain necessitates a homogeneous treatment whereby each particle of grain is exposed to substantially the same temperature, moisture level, chemical substances, kinetic energy, and anaerobic environment for the desired conditioning. The conditioning parameters are not established for individual particles but for the overall system and non-uniformity in treatment can negate the usefulness of the system as a whole. For this reason at least one embodiment of mixing means is shown for promoting homogeneous interaction which in the present embodiment includes a generally vertical vessel having a plurality of paddles disposed therein. As stated above, with reference to FIG. 1, a horizontal system can be equally efficient in providing the anaerobic pasteurizing conditioning of matter although other flow considerations must be considered.

Any suitable grain can be employed as a matter conditioned within the system 110 of the present invention. For example, typical of such grains are milo, wheat, oats, corn, barley, and the like. Further, it is believed that the conditioning of the grains results in the starch components of the feedstuffs being gelatinized. The gelatinization of the starches within the grains, coupled with the moisture control feature imparted to the grains by the treatment of the grain in an anaerobic, heated environment in accordance with the system 110 results in improved shelf life for the grain and renders the conditioned grain more palatable and digestible to the animal. However, as previously indicated, in order to obtain the most benefit from the conditioned grain, the conditioned grain is subjected to the compression treatment, i.e., pelletizing, flaking and the like, so that the gelatinized starch components in the conditioned grain can be fractionated. This results in a foodstuff which is more palatable and digestible to the animal.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. In combination with an anaerobic, pasteurizing conditioning system of the type wherein a vessel is adapted for the flow of grain to be conditioned therethrough and means are provided for injection of a treatment fluid therein, the improvement comprising:
    steam generator means for producing an effluent stream comprising steam and non-condensible gases, the generator means producing a sufficiently large volume of oxygen deficient gases and steam for purging the grain of other gases flowing therewith and maintaining a deficient oxygen level in the non-condensible gases for creating an anaerobic condition in the vessel; and
    homogenizer means for vaporizing water present in the effluent stream so as to provide a substantially water-free treatment fluid, the homogenizer means operably connected to the vessel and the steam generator means such that the substantially water-free treatment fluid discharged from said homogenizer means is introduced into said vessel for counter-current flow relative to grain passing therethrough.

2. The conditioning system as set forth in claim 1, wherein said homogenizer means comprises:
    an elongated tubular housing having a first end portion, a medial portion, and an opposed second end portion, the first and second end portions having a diameter substantially equal, the medial portion having a diameter greater than the first and second end portion; and
    angulated, arcuate shaped baffle means supported within the medial portion of the housing for directing flow of the treatment fluid therethrough in the direction of said vessel, said baffle means cooperating to define a central core flow path through the medial portion of said housing having a diameter substantially equal to the diameter of the first and second end portions.

3. The conditioning system as set forth in claim 1 further comprising:
    at least one airlock disposed in said vessel for permitting the egress of grain having passed therethrough while preventing the exhaust of steam therefrom; and means for permitting the controlled exhaust of non-condensible gases from said vessel.

4. The conditioning system as set forth in claim 3 further comprising means for controlling the operation of said steam generator means for producing said sufficiently large volume of said effluent stream.

5. The conditioning system as set forth in claim 4 wherein said steam generator means is a direct fired steam generator.

6. The conditioning system as set forth in claim 1, wherein said vessel is disposed in a generally vertical configuration and said system further comprises a diffuser disposed in a lower region of said vertically disposed vessel for discharging said substantially water-free treatment fluid upwardly in counter-current flow relative to grain passing therethrough.

7. The conditioning system as set forth in claim 4, wherein said means for controlling the operation of said steam generator means includes means for determining the oxygen level of non-condensible gases produced by said steam generator means and means for adjusting the combustion of said steam generator means to produce oxygen deficient non-condensible gases.

8. The conditioning system as set forth in claim 1, wherein said treatment fluid contains less than about 5% oxygen.

9. The conditioning system as set forth in claim 3 further comprising a second airlock disposed in said vessel for permitting the ingress of grain therein and increasing the operating pressure within said vessel.

10. The conditioning system as set forth in claim 9 wherein said means for permitting the controlled exhaust of substantially water-free treatment fluid includes a venting orifice disposed in the region of said second airlock whereby said substantially water-free treatment fluid is exhausted from said vessel after passing through said grain therein.

11. The conditioning system as set forth in claim 1 further comprising means for mixing said grain passing through said vessel with said substantially water-free treatment fluid for imparting a homogeneous interaction therebetween.

12. The conditioning system as set forth in claim 11 wherein said vessel comprises a generally vertically oriented cylindrical chamber adapted for receiving said grain at an upper end thereof, and discharging said grain matter from a lower region thereof and wherein said mixer means comprises a rotatably mounted rotor means within said vessel and a plurality of paddles secured to said rotor means for rotation with said rotor means to impart homogeneous mixing within said cylindrical chamber.

13. An improved method for conditioning grain by exposure of said grain to a substantially water-free treatment fluid within a conditioning vessel, the improvement comprising the steps of producing an effluent stream containing steam and oxygen deficient non-condensible gases, passing said effluent stream through homogenizer means to vaporize free water in liquid form present in said effluent stream and produce a substantially water-free treatment fluid, introducing said treatment fluid into said vessel for counter-current flow relative to grain passing therethrough in sufficient volume and with sufficient enthalpy for substantially purging the system of all oxygen laden gases and maintaining a temperature therein for anaerobic pasteurization of grain passing therethrough, and providing means for imparting a substantially homogeneous interaction between said grain and said treatment fluid within said vessel.

14. The product produced by the method of claim 13.

15. The method as set forth in claim 13 wherein said effluent stream is produced by a direct fired steam generator and said method further comprises producing carbonic acid with said direct fired steam generator such that said treatment fluid contains said carbonic acid for rendering said grain conditioned therein more acidic.

16. The product produced by the method of claim 15.

17. The method as set forth in claim 13 further comprising issuing of said grain from said vessel and compressing said grain to fractionate gelatinized starch present in the grain resulting from the conditioning of the grain prior to storage and subsequent animal consumption.

18. The product produced by the method of claim 17.

19. The method as set forth in claim 13 further comprising disposing said vessel in a generally vertical configuration, providing a diffuser for introducing said treatment fluid from said homogenizer means into a lower region of said vertically disposed vessel, and discharging said treatment fluid upwardly in counter-current flow relative to grain passing therethrough.

20. The product produced by the method of claim 19.

21. The method as set forth in claim 13 wherein said effluent stream is produced by a direct fired steam generator and said method further comprises determining the oxygen level of the effluent stream and adjusting the combustion of said direct fired steam generator to produce said oxygen deficient effluent stream.

22. The product produced by the method of claim 21.

23. An improved system for conditioning grain of the type wherein said grain is exposed to steam for enhancing the subsequent protein digestion, dry matter digestion, and starch availability after consumption by an animal, wherein the improvement comprises a conditioning vessel, steam generator means, means for controlling said generator for producing an anaerobic, oxygen deficient effluent stream comprising steam and non-condensible gases, means for homogenizing said anaerobic, oxygen deficient exhaust to vaporize water particles therein and provide a substantially water-free, anaerobic oxygen deficient treatment fluid, means for injecting said anaerobic, oxygen deficient treatment fluid into said vessel, means for imparting a homogeneous interaction between said grain and said substantially water-free treatment fluid within said vessel, means for providing said substantially water-free treatment fluid in a sufficient volume and with sufficient enthalpy for purging said vessel of substantially all gases, other than said substantially water-free treatment fluid and maintaining a temperature within said vessel for anaerobic pasteurization of said grain passing therethrough.

24. The system as set forth in claim 23 wherein said steam generator means is a direct fired generator capable of producing carbonic acid.

25. The system as set forth in claim 24, wherein said conditioning vessel comprises a generally vertically disposed chamber and said means for injecting said substantially water-free anaerobic, oxygen deficient treatment fluid into said vertically disposed chamber includes a diffuser disposed in a lower region of said vertically disposed chamber for discharging said substantially water-free treatment fluid upwardly in counter-current flow relative to grain passing therethrough.

26. The system as set forth in claim 25 wherein said direct fired vapor generator further comprises means for determining the oxygen level of non-condensible gases in the effluent stream produced therefrom and means for adjusting the combustion of said generator for producing the effluent stream containing oxygen deficient non-condensible gases.

27. The system as set forth in claim 26 further comprising means for controlling the enthalpy, partial pressure, and dew point within said vessel for selectively exposing said grain to preselect temperature and moisture level and therein conditioning said grain for enhanced protein breakdown, dry matter digestion, and starch availability.

28. The conditioning system as set forth in claim 27 wherein said means for homogenizing said anaerobic, oxygen deficient effluent stream comprises a tubular housing having a first end portion, a medial portion, and an opposed second end portion, the first and second end portions having an internal diameter substantially equal, the medial portion having an internal diameter greater than the internal diameters of the first and second end portion, and angulated, arcuate shaped baffle means supported within the medial portion of the housing for directing the flow of the treatment fluid therethrough in the direction of said vessel, said baffle means cooperating to define a core portion for the constant flow of said exhaust stream through the medial position of said housing so as to produce a substantially water-free treatment fluid, said core portion having an effective diameter substantially equal to the diameter of the first and second end portions.

* * * * *

UNITED STATES PATENT AND TRADEMARK OFFICE
CERTIFICATE OF CORRECTION

PATENT NO. : 4,833,793

DATED : May 30, 1989

INVENTOR(S) : Richard L. White

It is certified that error appears in the above-identified patent and that said Letters Patent is hereby corrected as shown below:

```
column 9, line 24 delete --"effluentstream"--
insert --"effluent stream"-- column 18, line 53 delete --"water-fee"--
insert --"water-free"--
```

Signed and Sealed this

Thirteenth Day of March, 1990

Attest:

JEFFREY M. SAMUELS

*Attesting Officer*    Acting Commissioner of Patents and Trademarks